United States Patent
Kuo et al.

(10) Patent No.: US 7,590,165 B2
(45) Date of Patent: Sep. 15, 2009

(54) SUB-SYSTEM BASED WINDOW PLACEMENT AND SIZE DECISION MECHANISM AND METHOD THEREOF

(75) Inventors: Kao-Yueh Kuo, Hsinchu (TW); Yu-Shu Chiu, Taoyuan (TW); Hui-Ming Wang, Taipei (TW); Jung-Yu Yen, Sinjhuang (TW)

(73) Assignee: Industrial Technology Research Institute, Hsinchu (TW)

( * ) Notice: Subject to any disclaimer, the term of this patent is extended or adjusted under 35 U.S.C. 154(b) by 424 days.

(21) Appl. No.: 11/177,856

(22) Filed: Jul. 8, 2005

(65) Prior Publication Data

US 2007/0009065 A1 Jan. 11, 2007

(51) Int. Cl.
*H04B 1/00* (2006.01)
*H03K 9/00* (2006.01)
*H04L 5/22* (2006.01)

(52) U.S. Cl. .......... 375/147; 375/140; 375/316; 370/330

(58) Field of Classification Search .......... 375/147, 375/140; 370/330
See application file for complete search history.

(56) References Cited

U.S. PATENT DOCUMENTS

| | | | |
|---|---|---|---|
| 3,738,438 A | 6/1973 | Ellner | |
| 5,781,543 A | 7/1998 | Ault | |
| 5,805,648 A | 9/1998 | Sutton | |
| 6,738,438 B2 | 5/2004 | Rick et al. | |
| 6,771,622 B1 | 8/2004 | Banerjee | |
| 6,775,252 B1 | 8/2004 | Bayley | |
| 2002/0154430 A1* | 10/2002 | Rae et al. | 360/25 |
| 2003/0086396 A1* | 5/2003 | Gurski et al. | 370/335 |
| 2003/0086512 A1* | 5/2003 | Rick et al. | 375/343 |
| 2003/0092392 A1* | 5/2003 | Komandur et al. | 455/67.1 |
| 2007/0006093 A1* | 1/2007 | Day et al. | 715/781 |

FOREIGN PATENT DOCUMENTS

WO 0176087 A1 10/2001

* cited by examiner

*Primary Examiner*—David C Payne
*Assistant Examiner*—Brian J Stevens
(74) *Attorney, Agent, or Firm*—Alston & Bird LLP

(57) ABSTRACT

A method of path detection in a multi-path communications system that includes selecting an object for configuring a search window, setting at least one sub-window, wherein the sub-window is smaller in size than the search window, providing a first counter for the object, setting a threshold, selecting a decision period for a duration of the object, and detecting a path in a selected region with the at least one sub-window in a plurality of modes corresponding to the threshold.

18 Claims, 4 Drawing Sheets

SUB-SYSTEM BASED WINDOW PLACEMENT AND SIZE DECISION MECHANISM AND METHOD THEREOF

BACKGROUND OF THE INVENTION

This invention pertains in general to a wireless communications system, and, more particularly, to a method and apparatus for a sub-system search window placement and size determination for a wireless communications system.

In a typical CDMA or WCDMA wireless communications system, a transmitted signal travels from a transmitter to a receiver over multiple paths. Prior to transmission, a base station multiplies the information signal intended for each of the mobile stations by a unique signature sequence, referred to as a pseudo-noise (PN) sequence. The signals for all subscriber mobile stations are then transmitted simultaneously by the base station. Upon receipt, each mobile station demodulates the received signal, the result of which is integrated to isolate the information signal intended for a particular mobile station from the other signals intended for other mobile stations. The signals intended for the other mobile stations appear as noise.

During transmission, each multi-path is considered a separate channel subject to interference effects such as fading, dispersion and birth-death. The CDMA or a WCDMA system employs a "rake" receiver, which demodulates a received signal using plural demodulation "fingers", each of which demodulates a signal component from a number of the channel paths. A typical rake receiver includes a plurality, from three to six, rake branches or "fingers," each of which is an independent receiver unit that assembles and demodulates one received multi-path assigned to the finger. The outputs of the rake fingers are combined to improve performance. Before the multi-path signals are demodulated, however, the delays of the multi-path signals must be ascertained.

To ascertain multi-path signal delays, a rake receiver operates in conjunction with a delay searcher and a plurality of delay trackers. The delay searcher conducts a "coarse" searching with a rough resolution so as to quickly analyze a received signal and ascertain the delays, which are then assigned to the rake fingers. In mobile communications, the channels may be subject to additional fading due to the motion of the receiver. The delay trackers therefore track the delays assigned by the searcher between channel searches. Thus, while the searcher looks over a wide range of delays, the trackers look for a smaller range surrounding the assigned delays.

Specifically, the delay searcher conducts searches within a predetermined search window at a given resolution. FIG. 1 shows a general representation of a search window and search resolution. Within each search window, there are a number of candidate paths, expanding from the shortest path to the longest path. Depending upon the size (width) of the search window, hundreds and even thousands searches for candidate paths may be required. An example of a searcher is a Multiple-Path Searcher (MPS) implemented in the wireless receiving end. It is preferable to reduce the search for true location of the path after sufficient path information is acquired. Therefore, a window decision mechanism would determine window placement and size of the search window.

However, search windows are generally provided by the network and are optimized only for handoff performance. Consequently, the estimator will typically exceed available search time constraints if the size of the predetermined search window is set too large or the window is inappropriately placed. One prior art proposes adjusting the window placement either to the right or left of the window center where the maximum power path identified. The adjustment is accomplished by increasing or decreasing a counter that controls the window placement.

Another prior art proposes a mechanism for window placement that configures forward and backward boundaries based on a reference power path delay or search window boundary. Window placement is adjusted when searched paths exceed the boundaries. The referenced power path delay may be set as the location of a reference power path delay from a previous adjustment, and the boundaries are set at equidistant distances from the reference.

U.S. Pat. No. 6,775,252 by Bayley describes a method and apparatus of adjusting a search window size by a remote unit in a slotted mode wireless communication system. Bayley describes that in a slotted mode communication system, the remote unit is in an "active state" during its assigned slot, and the controller in a remote unit passes selected sets of search parameters to a search engine. The search engine performs searches on base stations using the selected sets of search parameters. One search parameter, the search window size, is adjusted in response to a measured signal strength of a first base station signal. The adjusted search window size is used by the remote unit when searching other base stations. A finite state machine of the mechanism of Bayley, originally disclosed as FIG. 8, is reproduced as FIG. 2.

U.S. Pat. No. 6,738,438 by Rick et al. describes a parameter estimator for estimating one or more parameters from a correlation function derived from a signal using a dynamically variable search window. According to Rick et al., the parameter estimator may be employed in a subscriber station to estimate the time of arrival of one or more base station pilot signals in a wireless communication system. Therefore, Rick et al. appears to describe a method and mechanism that adjust window placement and window size at the same time, depending upon different thresholds to compare with the maximum power path received in order to ascertain the placement of the search window.

BRIEF SUMMARY OF THE INVENTION

In accordance with the invention, there is provided a method of path detection in a multi-path wireless communications system, comprising: configuring at least one sub-window; selecting an object for configuring a search window based on the at least one sub-window by placement and size for the multi-path search, wherein the sub-window is smaller in size than the search window; providing a first counter for the object; setting a threshold value as a reference for comparison; selecting a decision period for a duration of the object; detecting a path in a selected region with the at least one sub-window in a plurality of modes corresponding to the threshold; and repeating at least the detecting step for the duration of the decision period.

Also in accordance with the invention, there is provided a method of path detection in a multi-path wireless communications system, comprising: configuring a search window based on placement and size; configuring at least one sub-window, wherein the sub-window is smaller in size than the search window; providing a first counter and a second counter; resetting the first counter and the second counter; detecting a path in a selected region with the at least one sub-window in a plurality of modes corresponding to the threshold; reading back a sub-window information; increasing the first and second counters; and adjusting the sub-window based on the sub-window information.

The invention further provides a method of path detection in a multi-path wireless communications system, comprising: providing a sub-window counter; configuring a sub-window; setting a high threshold and setting a low threshold; resetting the sub-window counter; configuring a search window based on the sub-window; conducting a multi-path search to detect at least one path, wherein the at least one path is used as a counting reference for the sub-window counter; increasing the sub-window counter after conducting a multi-path search; and reading back a sub-window information and processing read back sub-window information.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Reference will now be made in detail to the present embodiments of the invention, examples of which are illustrated in the accompanying drawings. Wherever possible, the same reference numbers will be used throughout the drawings to refer to the same or like parts.

The present invention is directed to an adaptive sub-window based mechanism and method to determine and control the placement and size of search windows. Each sub-window is assessed for its effectiveness. Power consumption from redundant searches due to inadequate window placement or size is minimized. The sub-window based mechanism and method accurately determine the placement and size of the search window to reduce the size of the conventional search window. Using the sub-window as a unit, a rough profile of the search window is ascertained in rough resolution. Furthermore, using the previous resolution as a reference, the placement and size of the search window may be easily ascertained. The sub-window unit also simplifies the control search field for different objectives.

Figure 3:
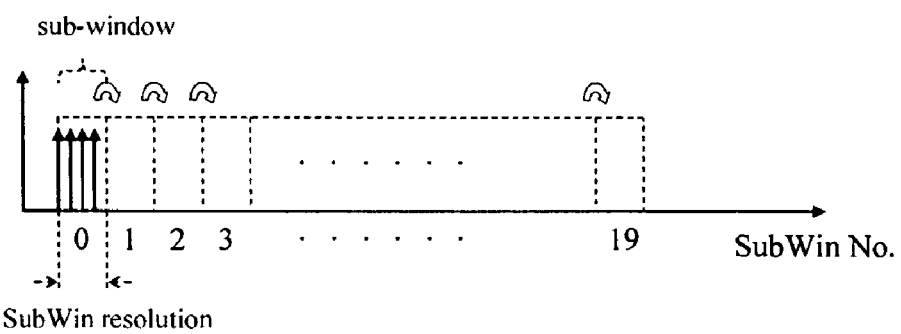
FIG. 3 is a representation of the concept of a sub-window in accordance with the present invention.
Figure 2:
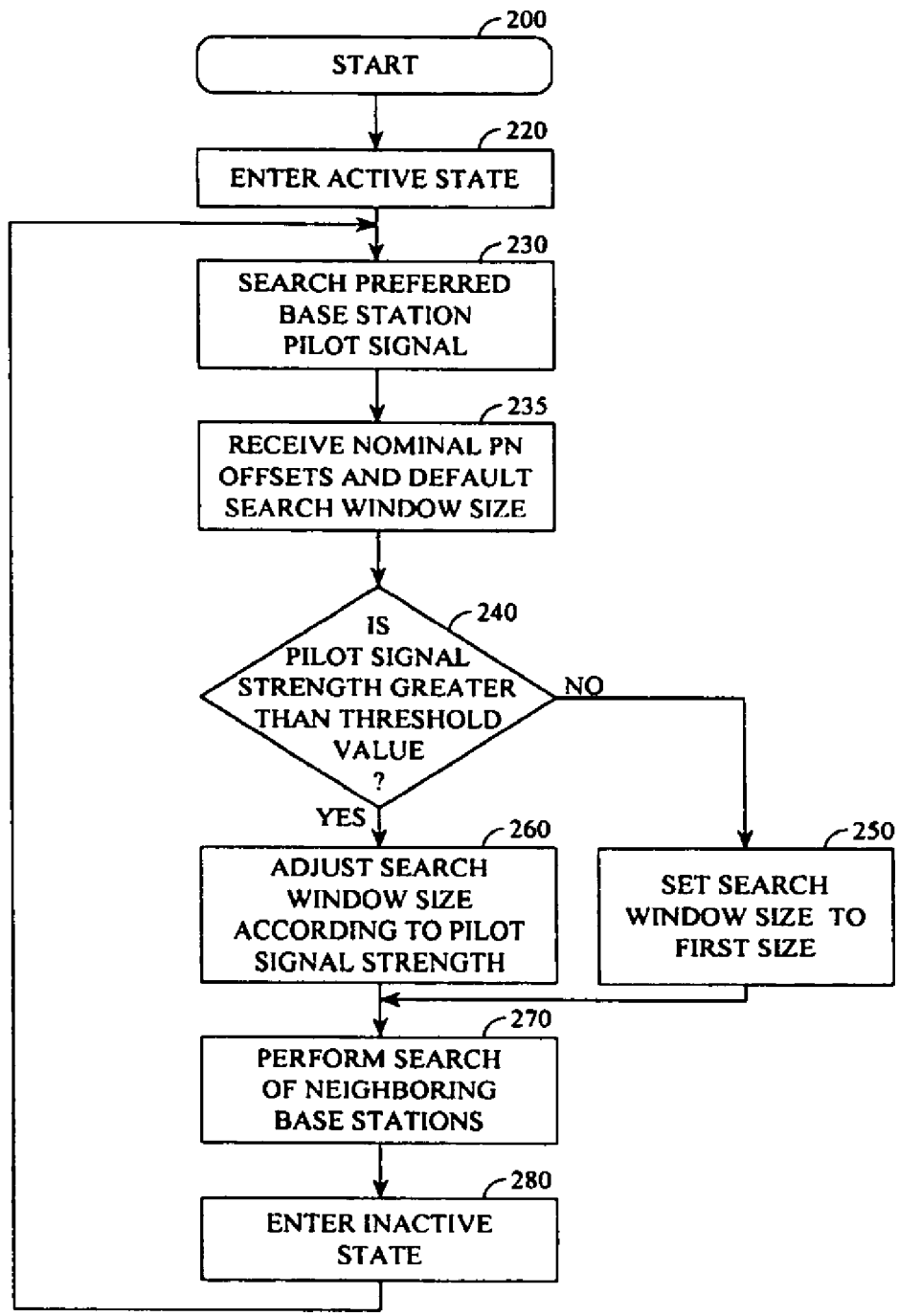
FIG. 2 is a flow diagram representing a conventional finite state machine.

FIG. 3 is a representation of a sub-window consisting with the present invention. A multiple path searcher, Such as an MPS, is generally adopted to collect more signal power when the signal is received. Consisting with one embodiment of the present invention, a sub-window delay profile is established in a sub-window unit based on information received by each sub-window in order to accurately determine the placement and size of the search window. However, an MPS only includes a limited number of correlators due to capacity constraints. Therefore, a search for different candidate delay paths employs several sub-windows on different time sequences as shown in FIG. 3. The true path delay may be one or several of the candidate paths.

In general with the present invention and taking into consideration various objectives of the mechanism to control the search window, a decision period is configured, a period counter is established, and a sub-window counter corresponding to each sub-window is established. According to the desired sub-window information, the number of paths detected in the sub-window is counted using the sub-window counter within each decision period. Thus, one or more thresholds are configured depending on the need for adjusting the window placement and size. As each cycle ends, the counts are compared with a threshold to provide a reference to decide the placement and size of the search window.

The evaluation, processing and configuration for the search window are decided in terms of the starting position, end position, one continuous region, or multiple separate regions. With a sub-window serving as a unit, the mechanism and method also facilitate control in the searched range to achieve the desired objectives. The control includes using newly estimated placement and size only, covering previous configured range, expanding low efficient sub-windows to maintain path detect-rate, shrinking high efficient sub-windows to reduce power consumption , and adding channel and velocity estimation to provide references for the expansion and shrinking of sub-windows. Each sub-window may be considered alone or in combination to increase flexibility. As a result, the present invention requires less memory and is easier to evaluate the placement and size of the search window as compared to conventional systems.

The number of counted information in the sub-window may be counted according to different considerations such as path detected, valid path number, main path power over a level and sub-window power over a level. The placement of search window may be implemented by taking into consideration the window center, defined as the sub-window with the highest count, and window boundary whose sub-window value is greater than a predetermined threshold. The determination of the search window size may be implemented by taking into consideration different levels of shrinking of sub-windows when their values are greater than predetermined threshold levels, or different levels of expansion of sub-windows when their values are less than predetermined thresholds. The placement and size related window process include forming the window from one continuous region or from multiple separate regions.

Figure 4:
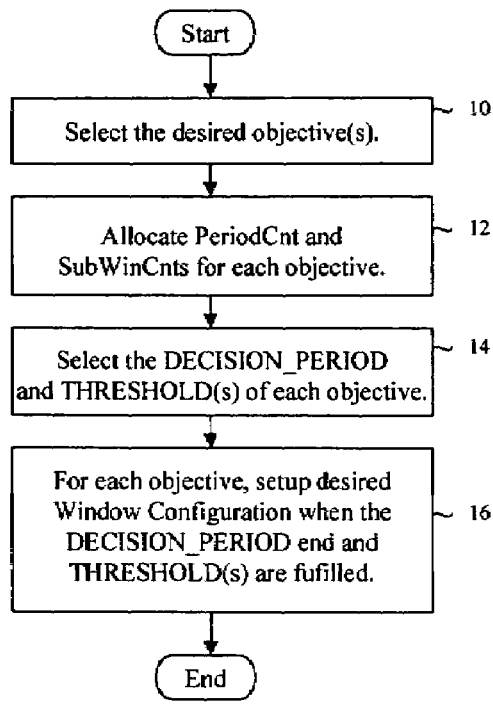
FIG. 4 is a flow diagram illustrating one embodiment of the present invention.

FIG. 4 is a flow diagram illustrating one embodiment of the present invention. The mechanism and method of the present invention are applicable to different number of sub-windows and include parameterized configurations, such as count basis of the sub-window counter, process mode of the window, decision period, and threshold. Referring to FIG. 4, the objectives for configuring the search window, such as tracking, shrinking, and expanding are selected at step 10 before establishing counters such as the period counter PeriodCnt and sub-window counters SubWinCnts. At step 12, the appropriate counters are allocated, depending upon the objective selected. A decision period DECISION_PERIOD and threshold(s) SubWinCnts that match the selected objective are selected at step 14. To achieve the selected objective, the window is processed in different modes to configure corresponding thresholds at step 16. As different objectives are to be achieved simultaneously, several counters, periods, thresholds and other parameters may be configured provided that there are no conflicts among them. In the process mode where different counters and decision periods correspond to different thresholds, the counters, decision periods and thresholds may be shared so long as there are no conflicts among them.

Figure 5:
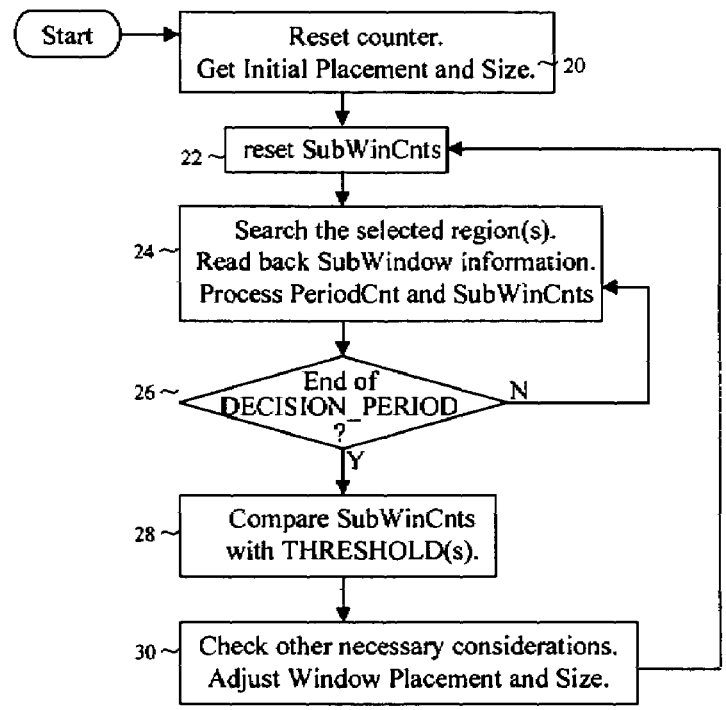
FIG. 5 is a flow chart illustrating a finite state machine consistent with one embodiment of the present invention.

The process shown and described according to FIG. 4 are evaluated and decided with the finite state machine illustrated in FIG. 5. Referring to FIG. 5, period counter PeriodCnt is reset and information regarding the initial placement and size are obtained at step 20. In another embodiment, the counter is a tracking counter TrkCnt that is also reset at step 20.

Sub-window counters SubWinCnts are then reset at step 22 to start searching for the selected region(s) at step 24. After the search, the desired sub-window information is read back and the count of the period counter is increased. Based on the read back information, each sub-window is increased from the originally configured count. Processes such as searching of the selected region(s), reading back of the sub-window information, and processing of the counter are repeated within the originally configured decision period DECISION_PERIOD at step 26. At the end of the decision period, the value of sub-window counters SubWinCnts are compared with one or more predetermined thresholds at step 28. The determination of the processing mode of searching the entire window or searching separate sub-windows is contingent upon whether the counter value is higher or lower than the thresholds. At step 30, the window placement and size may be adjusted by taking into consideration factors as estimating new placement and size, previously configured or selected range, expanding low efficient sub-window to maintain path detect-rate, shrinking high efficient sub-window to reduce power consumption, and adding channel and velocity estimation to provide reference for expansion and shrink. Finally, a decision is made whether the search window range of the next period is formed from one continuous region or multiple separate regions, as well as to the placement and size of each of the regions. As the selected region(s) of the search window are re-configured based on the decision, the sub-window counter is reset before the start of the new period. When the decision period is checked consistent with the present invention, the period counter should be reset.

Figure 1:
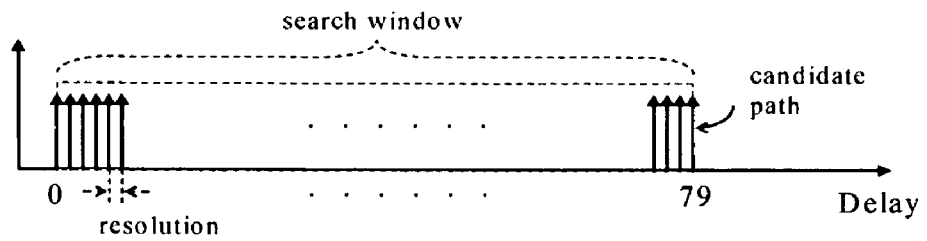
FIG. 1 is a representation of the concept of a search window.

As an MPS is required to search a long section of delay, and with the limited number of correlators, the search for different candidate delay paths is accomplished by using several sub-windows on different time sequences. However, the true path may include a path delay that is one or several of the candidate paths as shown in FIG. 1, resulting in redundant researches. An MPS implementing the present invention is able to achieve accurate searching and shrinking of the search window to eliminate redundant searches, and accordingly decreasing power consumption.

Figure 6:
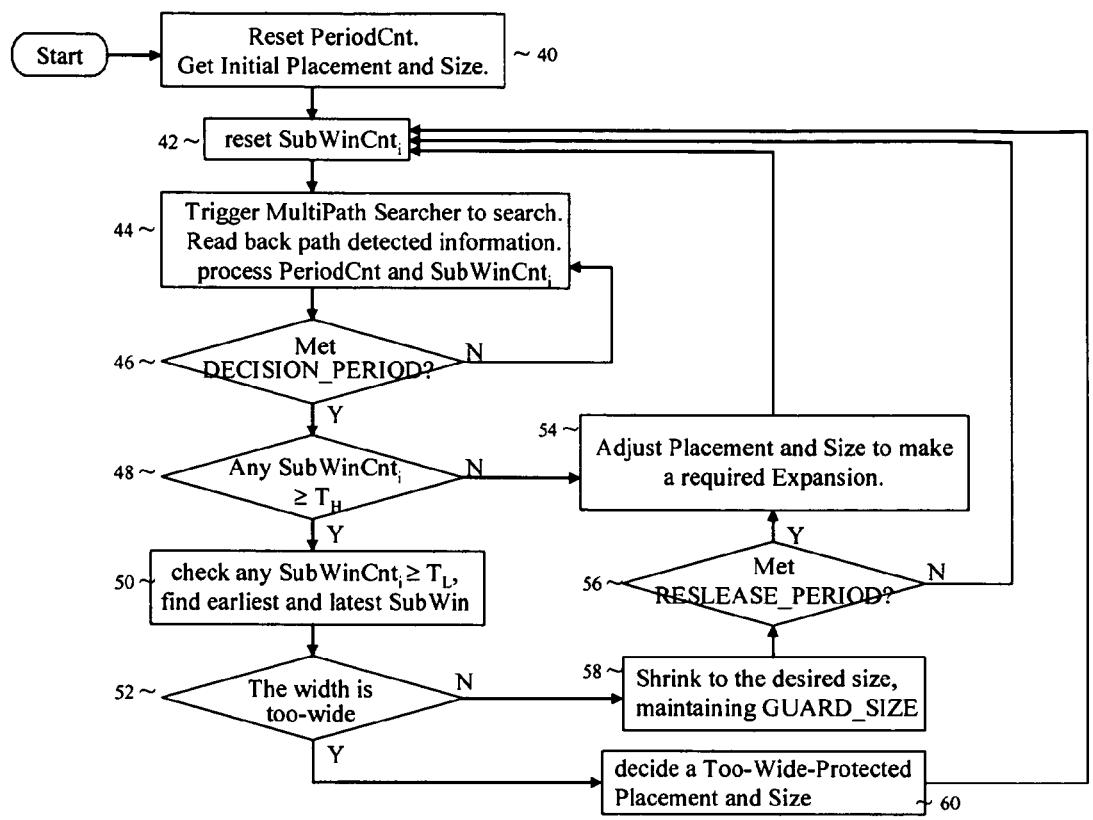
FIG. 6 is a finite state machine consistent with another embodiment of the present invention.

FIG. 6 is a finite state machine consistent with one embodiment of the present invention for window tracking, shrinking, and expansion when the embodiment is operated. In general, the window tracking, shrinking, and expansion share the same period, decision, threshold, and sub-window counters. A decision on the release period of the window is added to respond to interference effects such as the birth-death effect that would likely occur in the multiple path environment. In addition, the earliest and latest path delays (also known as the shortest and longest path delays) preferably include reasonable ranges. A Too-Wide-Protect value is added to prevent the window size from being set too wide and therefore maintain a reasonable window size or width. A corresponding GUARD_SIZE value is added to prevent over-shrinking of a window to reduce path loss and maintain confidence level.

Referring to FIG. 6, a period counter PeriodCnt is reset and the initial placement and size are obtained at step 40. Sub-window counters SubWinCnts are also reset before the initial search at step 42. The multi-path search is triggered at step 44, the period counter is increased, and the read back of sub-window information is processed. The path detected is used as a counting reference for the sub-window counter, and one count is added in the presence of the path detected in the sub-window, regardless of the number of the path detected. The above operation is repeated within for the decision period DECISION_PERIOD at the loop set forth in step 46. The period counter is shared with the decision of the release period without resetting the period counter.

In the threshold configuration, two thresholds, high threshold ($T_H$) and low threshold ($T_L$), are used. As each decision period ends, the count value of each sub-window counter is compared with the high threshold ($T_H$) at step 48. If all of the counts are not higher than or equal to high threshold $T_H$, the received signal power is too low or therefore the received path is not stable. Since no reliable decision can be made for the window placement and size, the size of the search window is expanded at step 54. The size of the window may be expanded in full, by step, or by estimation, such as channel or velocity estimation in different aspects. Steps 42-48 are then repeated.

On the other hand, if any one of the counts is higher than or equal to the high threshold, the search window may be shrunk relative to the low threshold value at step 50. However, if any shrinking of the window is to be performed, the shrinking are not necessarily symmetrical since the count value of each sub-window counter is compared with the low threshold $T_L$ to decide the earliest and latest sub-windows of the search window, each of which must be greater than or equal to the low threshold. A determination is then made at step 52 whether the window size, or width, is too wide. If not, the window is shrunk to retain fixed or estimation-dependent GUARD_SIZE at step 58. Indeed, the guard size may serve as the search window for the next decision period. The release period is then checked at step 56.

Similarly, if the window size is too wide, a Too-Wide-Protected value limits the placement and size of the search window at step 60. The above actions are combined to generate operations that a constant decision for the window placement and size can be made to directly match different path delays and achieve window tracking effect. Also, the earliest and latest path delays are set at reasonable ranges. Furthermore, the window is expanded by taking into account birth-death effect that might occur in a multiple path environment, considering probable channel environment, and configuring the release period. The length of the period is varied depending on application requirements. A shorter release period can reduce path loss, whereas a longer release period can prevent redundant power consumption.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method of path detection in a multi-path wireless communications system, comprising:
 receiving a wireless signal;
 configuring a plurality of sub-windows;
 selecting an objective for configuring a search window based on the plurality of sub-windows, wherein each of the sub-windows is smaller in size than the search window;
 providing a first counter for the objective;
 providing a separate second counter for each sub-window of the plurality of sub-windows;
 setting a threshold value as a reference for comparison;
 selecting a decision period for a duration of the objective;
 identifying whether at least one path is detected in each of the plurality of sub-windows;
 increasing the second counter for the each sub-window by one count if at least one path is detected in the each sub-window;
 repeating the steps of identifying and increasing until an end of the decision period;
 comparing counts of the second counters for the plurality of sub-windows with the threshold; and
 identifying a placement and a size of the search window.

2. The method of claim 1, wherein selecting an objective for configuring a search window includes selecting from one of tracking, shrinking and expanding a search window.

3. The method of claim 1, wherein the first counter includes one of a period counter and a tracking counter.

4. The method of claim 1, further comprising:
 resetting the first and second counters; and
 obtaining information regarding an initial placement and size of the search window.

5. The method of claim 4, further comprising:
 reading back a sub-window information;
 increasing the first and second counters; and
 adjusting the sub-window based on the sub-window information.

6. The method of claim 5, whereas at an end of the decision period, a value of the second counter is compared with at least one predetermined thresholds.

7. The method claim 5, wherein at least one of a placement or size of the search window is adjusted by one of expanding a relatively low efficient sub-window to maintain a path detect-rate; and shrinking a relatively high efficient sub-window to reduce power consumption.

8. The method of claim 5, further comprising determining whether a range of the search window includes one of a continuous region and multiple separate regions.

9. A method of path detection in a multi-path wireless communications system, comprising:
 receiving a wireless signal;
 configuring a search window having a placement and size;
 configuring a plurality of sub-windows, wherein each of the sub-windows is smaller in size than the search window;
 providing a first counter for counting a decision period and a separate second counter for each sub-window of the plurality of sub-windows;
 resetting the first counter and the second counter;
 identifying whether at least one path is detected in each of the plurality of sub-windows;
 reading back sub-window information regarding whether at least one path is detected in each of the plurality of sub-windows;
 updating the first counter and increasing the second counters for the each sub-window by one count if at least one path is detected in the each sub-window;
 repeating the steps of identifying and reading until the first counter counts to an end of the decision period; and
 adjusting the sub-window based on counts of the second counters for the plurality of sub-windows.

10. The method of claim 9, wherein the first counter includes one of a period counter and a tracking counter.

11. The method of claim 9, further comprising obtaining information regarding an initial placement and size of the search window.

12. The method of claim 9, wherein values of the second counters are compared with at least one predetermined threshold.

13. The method claim 9, wherein at least one of a placement or size of the search window is adjusted by one of expanding a relatively low efficient sub-window to maintain a path detect-rate and shrinking a relatively high efficient sub-window to reduce power consumption.

14. A method of path detection in a multi-path wireless communications system, comprising:
 receiving a wireless signal;
 providing a separate sub-window counter for each sub-window of a plurality of sub-windows;
 setting a high threshold and setting a low threshold;
 resetting each sub-window counter;
 configuring a search window based on the plurality of the sub-windows;
 increasing at least one sub-window counter by one count if at least one path is detected in a respective sub-window for the at least one sub-window counter after conducting a multi-path search;
 obtaining a count value of each sub-window counter after a decision period; and
 adjusting the search window based on the high threshold, the low threshold and the count values of the sub-window counters.

15. The method of claim 14, further comprising
 comparing the count values of the sub-window counters with the high threshold; and
 expanding the search window when the count values are smaller than the high threshold.

16. The method of claim 14, further comprising:
 providing a period counter to count the decision period;
 resetting the period counter; and
 obtaining an initial placement and size of the search window.

17. The claim of claim 14, further comprising:
 comparing the count values of the sub-window counters with the high threshold; and
 shrinking the search window when the count values are greater than or equal to the high threshold.

18. The method of claim 17, wherein a boundary of the search window to be shrunk is based on the low threshold and the boundary value is greater than or equal to the low threshold.

* * * * *

UNITED STATES PATENT AND TRADEMARK OFFICE
CERTIFICATE OF CORRECTION

| | | |
|---|---|---|
| PATENT NO. | : 7,590,165 B2 | Page 1 of 1 |
| APPLICATION NO. | : 11/177856 | |
| DATED | : September 15, 2009 | |
| INVENTOR(S) | : Kuo et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 718 days.

Signed and Sealed this

Twenty-first Day of September, 2010

David J. Kappos
*Director of the United States Patent and Trademark Office*